(12) United States Patent
Abernathy et al.

(10) Patent No.: US 7,769,986 B2
(45) Date of Patent: Aug. 3, 2010

(54) METHOD AND APPARATUS FOR REGISTER RENAMING

(75) Inventors: Christopher Michael Abernathy, Austin, TX (US); William Elton Burky, Austin, TX (US); Jens Leenstra, Bondorf (DE); Nicolas Maeding, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/742,905

(22) Filed: May 1, 2007

(65) Prior Publication Data

US 2008/0276076 A1  Nov. 6, 2008

(51) Int. Cl.
*G06F 12/00* (2006.01)
(52) U.S. Cl. ...................................... 712/217
(58) Field of Classification Search ............... None
See application file for complete search history.

(56) References Cited

U.S. PATENT DOCUMENTS

| | | | | |
|---|---|---|---|---|
| 5,918,005 | A * | 6/1999 | Moreno et al. | 714/38 |
| 6,324,640 | B1 * | 11/2001 | Le et al. | 712/217 |
| 6,470,435 | B2 * | 10/2002 | Samra et al. | 711/202 |
| 7,475,224 | B2 * | 1/2009 | Gschwind | 712/217 |
| 7,506,139 | B2 * | 3/2009 | Burky et al. | 712/217 |

\* cited by examiner

*Primary Examiner*—Eric Coleman
(74) *Attorney, Agent, or Firm*—Yee & Associates, P.C.; Diana R. Gerhardt (57) ABSTRACT

A method and apparatus for register renaming are provides in the illustrative embodiments. A mapper receives a request for a data in a logical register. The mapper searches an in-flight map table and a set of architected map tables for the data in the logical register. The mapper identifies an entry in one of the in-flight map table and an architected map table in the set of architected map tables that corresponds with the logical register in the request. The mapper returns a location of a physical register, which holds the requested data.

16 Claims, 6 Drawing Sheets

METHOD AND APPARATUS FOR REGISTER RENAMING

BACKGROUND OF THE INVENTION

1. Field of the Invention

The present invention relates generally to an improved data processing system, and in particular, to a computer implemented method and apparatus for processing instructions in a processor. Still more particularly, the present invention relates to a computer implemented method and apparatus for register renaming for a merged register file.

2. Description of the Related Art

Software developers write software in a programming language. Using applications, such as compilers, software developers translate the software from programming language code into executable instructions. Executable instructions are instructions that a processor in a data processing system can execute to generate the results intended from the software.

In computer architecture, a register is a small amount of very fast computer memory used to speed up the execution of instructions by providing quick access to commonly used values, and the values being calculated at a given point in time. Most, but not all, modern computer architectures operate on the principle of moving data from main memory into registers, operating on them, and then moving the result back into main memory. Such an architecture is a load-store architecture. The processor in a computer uses and reuses the registers in this manner as some instructions in the registers finish executing and new instructions load into the registers for execution. A variety of processor architectures exist for the processors. All of these processor architectures implement registers in some form for the purpose described above.

Classification of registers classifies the registers into different types depending upon their main use. Some examples of the different types of registers are as follows. General-purpose registers (GPRs) are registers that can store both data and address of the data. Floating-point registers (FPRs) are used for floating point computation. Vector registers (VMX) hold data for vector processing done by Single Instruction, Multiple Data instructions (SIMD). Modern processor architectures use many other types of registers.

SUMMARY OF THE INVENTION

The illustrative embodiments provide a computer implemented method and apparatus for register renaming. A mapper receives a request for a data in a logical register. The mapper searches an in-flight map table and a set of architected map tables for the data in the logical register. The mapper identifies an entry in one of the in-flight map table and an architected map table in the set of architected map tables that corresponds with the logical register in the request. The mapper returns a location of a physical register, which holds the requested data.

BRIEF DESCRIPTION OF THE DRAWINGS

The appended claims set forth the novel features believed characteristic of the invention. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
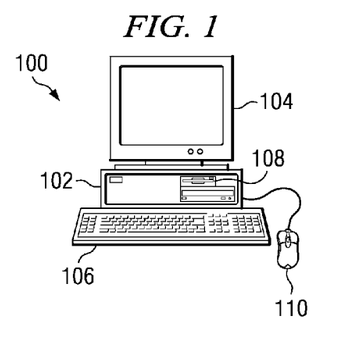
FIG. 1 depicts a pictorial representation of a data processing system, which an implementation of the illustrative embodiments may use.
Figure 2:
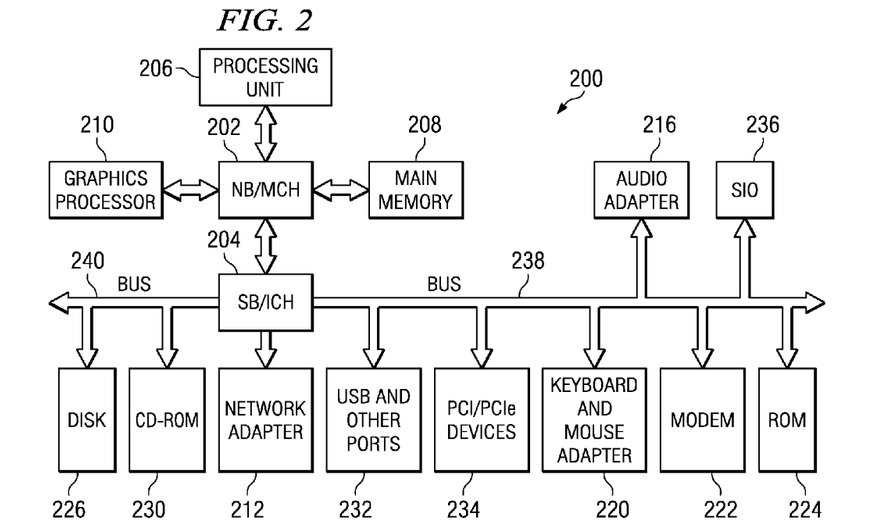
FIG. 2 depicts a block diagram of a data processing system in which illustrative embodiments may be implemented.

With reference now to the figures and in particular with reference to FIGS. 1 and 2, these figures are exemplary diagrams of data processing environments in which illustrative embodiments may be implemented. FIGS. 1 and 2 are only exemplary and do not assert or imply any limitation with regard to the environments in which different embodiments may be implemented. Specific implementations may make many modifications to the depicted environments.

With reference now to the figures and in particular with reference to FIG. 1, this figure depicts a pictorial representation of a data processing system, which an implementation of the illustrative embodiments may use. Computer 100 includes system unit 102, video display terminal 104, keyboard 106, storage devices 108, which may include floppy drives and other types of permanent and removable storage media, and mouse 110. Personal computer 100 also may contain additional input devices. Examples of additional input devices include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may use other types of data processing systems for implementation. For example, other embodiments may use a network computer for implementation. Computer 100 also includes systems software residing in computer-readable media in operation within computer 100 implementing a graphical user interface (GUI).

Next, FIG. 2 depicts a block diagram of a data processing system in which illustrative embodiments may be implemented. Data processing system 200 is an example of a computer, such as computer 100 in FIG. 1, which may contain the code or instructions implementing the processes of the illustrative embodiments.

In the depicted example, data processing system 200 employs a hub architecture, including a north bridge and memory controller hub (NB/MCH) 202 and a south bridge and input/output (I/O) controller hub (SB/ICH) 204. Processing unit 206, main memory 208, and graphics processor 210 couple to north bridge and memory controller hub 202. Processing unit 206 contains one or more processors and may use one or more heterogeneous processor systems for implementation. For example, an accelerated graphics port (AGP) may couple Graphics processor 210 to the NB/MCH through.

In the depicted example, local area network (LAN) adapter 212 couples to south bridge and I/O controller hub 204, audio adapter 216, keyboard and mouse adapter 220, modem 222, read only memory (ROM) 224, universal serial bus (USB) and other ports 232. PCI/PCIe devices 234 couples to south bridge and I/O controller hub 204 through bus 238. Hard disk drive (HDD) 226 and CD-ROM 230 couple to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. Super I/O (SIO) device 236 may couple to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Storage devices, such as hard disk drive 226 store the instructions for the operating system, the object-oriented programming system, and applications or programs. Main memory 208 contains these instructions and processing unit 206 executes the instructions located in main memory 208. Processing unit 206 may perform the processes of the illustrative embodiments, using computer implemented instructions, which a memory contains. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may substitute or supplement the hardware depicted in FIG. 1 and FIG. 2. Additionally, the processes of the illustrative embodiments may run in a multiprocessor data processing system.

Specific implementations may vary the systems and components from the illustrative examples shown in FIG. 2. In some illustrative examples, data processing system 200 may be a tablet computer or a laptop computer.

Specific implementations can also vary other components from the illustrative examples shown in FIG. 2. For example, one or more buses may comprise a bus system, such as a system bus, an I/O bus, and a PCI bus. Any suitable type of communications fabric or architecture that provides for a transfer of data between different components or devices attached to the fabric or architecture may form the bus system. Additionally, a communications unit may include one or more devices used to transmit and receive data, such as a modem or a network adapter. Further, a memory may be, for example, main memory 208 or a cache such as in north bridge and memory controller hub 202. Also, a processing unit may include one or more processors or CPUs.

The depicted examples in FIG. 1 and FIG. 2 do not imply architectural limitations. In addition, the illustrative embodiments provide for a computer implemented method, apparatus, and computer-usable program code for compiling source code and for executing code. A data processing system, such as data processing system 100 shown in FIG. 1 or data processing system 200 shown in FIG. 2, may perform the methods described with respect to the depicted embodiments.

Figure 3:
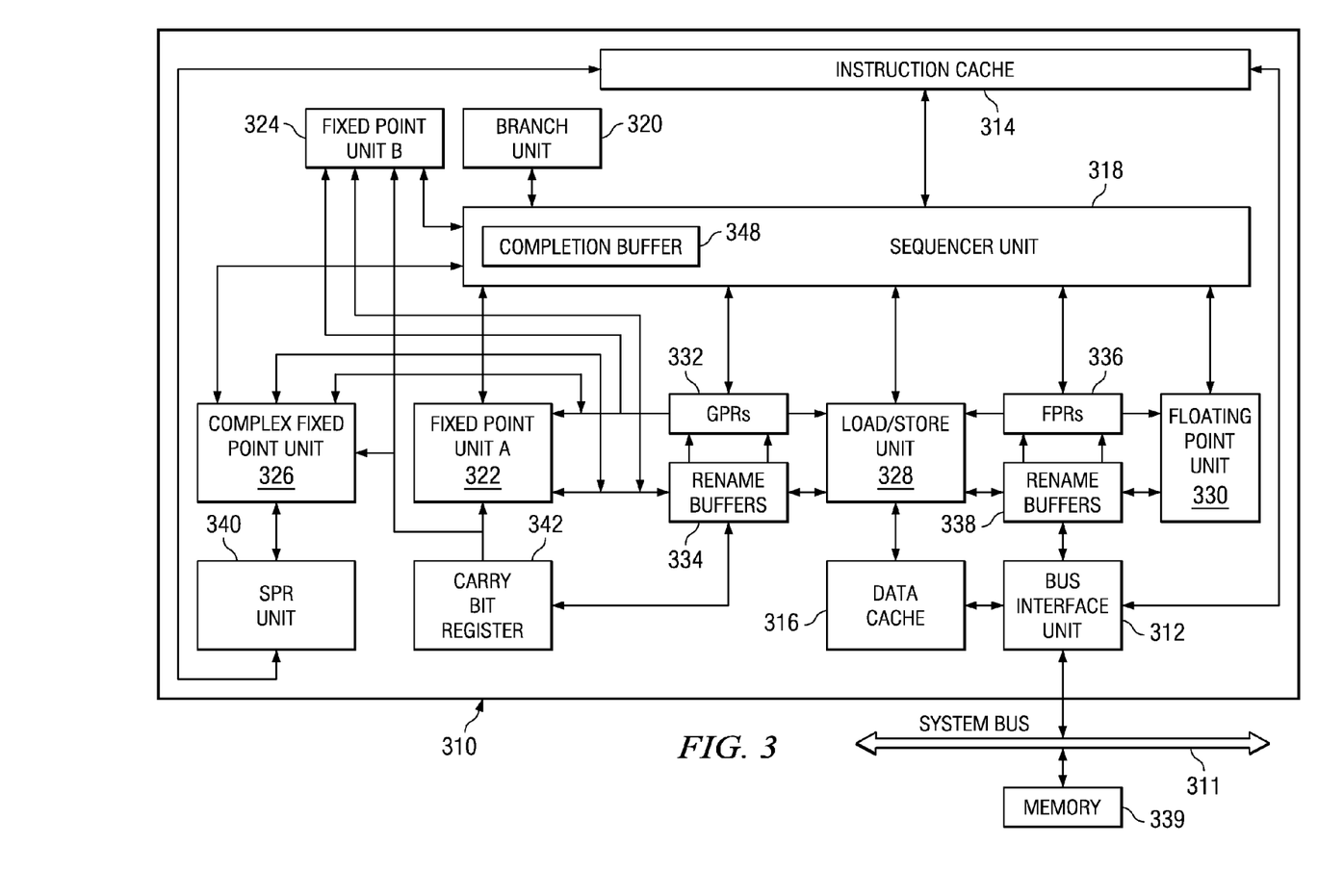
FIG. 3 depicts a block diagram of a processor system for processing information in accordance with an illustrative embodiment.

With reference now to FIG. 3, this figure depicts a block diagram of a processor system for processing information in accordance with an illustrative embodiment. In the illustrative embodiment, processor 310 is a single integrated circuit superscalar microprocessor. Accordingly, as discussed further herein below, processor 310 includes various units, registers, buffers, memories, and other sections, all of which are formed by integrated circuitry. Also, in the illustrative embodiment, processor 310 operates according to reduced instruction set computer ("RISC") techniques. As shown in FIG. 3, a system bus 311 connects to a bus interface unit ("BIU") 312 of processor 310. BIU 312 controls the transfer of information between processor 310 and system bus 311.

BIU 312 connects to an instruction cache 314 and to a data cache 316 of processor 310. Instruction cache 314 outputs instructions to a sequencer unit 318. In response to such instructions from instruction cache 314, sequencer unit 318 selectively outputs instructions to other execution circuitry of processor 310.

In addition to sequencer unit 318, in the illustrative embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330. FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 342. FXUA 322, FXUB 324, CFXU 326, and LSU 328 output results (destination operand information) of their operations for storage at selected entries in GPRs 332. Also, CFXU 326 inputs and outputs source operand information and destination operand information to and from special-purpose register processing unit ("SPR unit") 340.

FPU 330 inputs its source operand information from floating-point architectural registers ("FPRs") 336. FPU 330 outputs results (destination operand information) of its operation for storage at selected entries in FPRs 336.

Note that this description is of a general processor architecture, and illustrates the commonly known components of a processor. The illustrative embodiments described below pertain to processor architecture that merges GPRs 332 and fixed-point rename buffers 334 as one structure called the general-purpose registers, and merges FPRs 336 and floating-point rename buffers 338 into one structure called the floating-point registers. Each of these merged structures is called a merged register file.

In response to a Load instruction, LSU 328 inputs information from data cache 316 and copies such information to selected ones of GPRs 332 and FPRs 336. If data cache 316 does not already store such information, then data cache 316 inputs (through BIU 312 and system bus 311) such information from a system memory 339 connected to system bus 311. Moreover, data cache 316 is able to output (through BIU 312 and system bus 311) information from data cache 316 to system memory 339 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If instruction cache 314 does not already store one or more of the sequence of instructions, then instruction cache 314 inputs (through BIU 312 and system bus 311) such instructions from system memory 339 connected to system bus 311.

In response to the instructions input from instruction cache 314, sequencer unit 318 selectively issues the instructions to one of the selected execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." An instruction is normally processed as six stages, namely fetch, decode, issue, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318. In the decode stage, sequencer unit 318 decodes up to four fetched instructions.

In the issue stage, sequencer unit 318 selectively issued up to four decoded instructions to selected (in response to the decoding in the decode stage) ones of execution units 320, 322, 324, 326, 328, and 330 after reserving register file entries for the issued instructions' results (destination operand information). In the issue stage, operand information is supplied to the selected execution units for issued instructions.

In the execute stage, execution units execute their issued instructions and output results (destination operand information) of their operations for storage at selected entries in register files 332 and 336 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage in the general processor of FIG. 3, sequencer unit 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In contrast, in a processor employing merged register files, such as in the illustrative embodiments, the data does not move from the rename buffer to the register file upon completion of an instruction. Instead, in a processor employing merged register file, simply the pointers to the physical register in the merged register file change.

In the illustrative embodiment, an exemplary instruction uses one machine cycle to complete each of the stages of instruction processing. Nevertheless, some instructions (e.g., complex fixed-point instructions executed by CFXU 326) may use more than one machine cycle. Accordingly, a variable delay may occur between a particular instruction's execution and completion stages in response to the variation in time required for completion of preceding instructions.

A completion buffer 348 within sequencer unit 318 tracks the completion of the multiple instructions, which are being executed within the execution units. Upon an indication that an instruction or a group of instructions have been completed successfully, in an application specified sequential order, completion buffer 348 may initiate the transfer of the results of those completed instructions to the associated general-purpose registers. In a processor employing merged register files, completion buffer 348 may update the physical register pointers of the merged register file.

A logical register is a reference to a register in the instructions. A physical register is a register physically implemented in the processor hardware. Just as the physical registers can be of different types, for example, general-purpose register and floating-point register, logical registers can correspond to specific types of physical registers. For example, a logical register corresponding to a physical general-purpose register is a logical general-purpose register.

In other words, a logical register is a register that is a temporary name for a physical register. For example, an instruction may need to write to a physical general-purpose register. If the instruction writes to a specific physical general-purpose register, the instruction may overwrite valid data in that specific physical general-purpose register because the instruction has insufficient information about the state of the data in that register. Therefore, instead of containing a write instruction for a specific physical general-purpose register, the instruction contains a write instruction to a particular logical register. The instructions in a set of instructions, including the present instruction, use the specific logical register in a way that is consistent with the intentions of the software developer. When the instruction executes, a processor component matches up the particular logical register with a specific physical general-purpose register based on all the other instructions that are in-flight in the processor at that time.

In most but not all processor architectures, the processor may actually implement more physical registers than the number of logical registers used in the instructions that execute on that processor. For example, the number of logical general-purpose registers may be limited to 32 but the processor may implement 112 physical general-purpose registers.

Most modern processors implement a process called register renaming. Register renaming is a process for mapping a logical register to a physical register. A component called a mapper performs the process of register renaming. The mapper may be a hardware, a software, or a combination of hardware and software.

Figure 4:
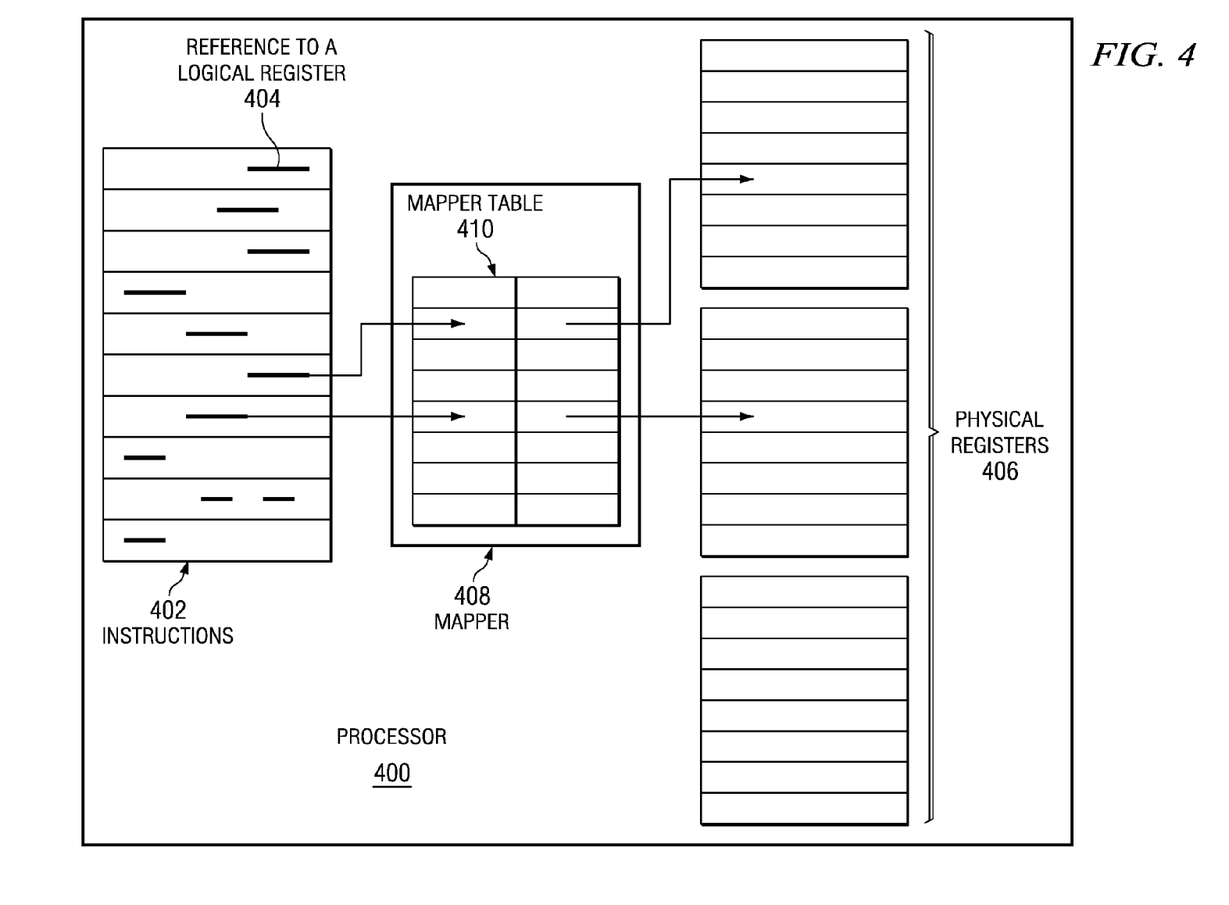
FIG. 4 depicts a block diagram of a processor that uses register renaming in accordance with an illustrative embodiment.

With reference now to FIG. 4, this figure depicts a block diagram of a processor that uses register renaming in accordance with an illustrative embodiment. Processor 400 may be processor 310 in FIG. 3. Instructions 402 may be the instructions that processor 400 is processing at a given time. Instructions 402 include references to logical registers. Referenced logical register in turn references a physical register in the manner described above. Reference to a logical register 404 is an exemplary reference to an exemplary logical register in an exemplary instruction in instructions 402.

Processor 400 further includes physical registers 406. Some physical registers 406 may be general-purpose registers, such as GPRs 332 in FIG. 3; some other physical registers 406 may be floating-point registers, such as FPRs 336 in FIG. 3; yet other physical registers 406 may be vector registers, such as VMXs. Mapper 408 includes a mapper table 410 for register renaming.

The following example illustrates the operation of the mapper. A processor may receive a set of instructions to execute. A set of instructions is one or more instructions. In the set of instructions, a reference to a logical register 5 may appear in several places. In certain cases, rewriting the same register may not be desirable. Therefore, using the register renaming process, the mapper may rename the first occurrence of logical register 5 to a physical register 0. The mapper may rename the second occurrence of logical register 5 to a physical register 1, and so on, thus preventing the rewrite of the same logical register 5 referenced in multiple places in the set of instructions.

Illustrative embodiments recognize that presently a mapper implements a table that contains the mapping of each physical register to a logical register. This table is called the mapper table. For example, for a particular processor with 112 physical registers, the mapper implements a table that contains 112 rows, each row containing information about each physical register's mapping to a logical register.

Illustrative embodiments further recognize that among the entries in the mapper table, the mapper also has to track which entry for a given logical register is the youngest. The following example illustrates the concept of youngest entry and youngest mapping.

The number of logical registers being less than the number of physical registers, in a mapper table, several entries may have the same logical register mapped to different physical registers. For example, at a given instance in time, for a given set of instructions, the mapper table may include three rows that map three occurrences of logical register 5 in the set of instructions to physical registers 0, 1, and 2.

In this state of the mapper table, the mapper has to track which of the three mappings is the youngest mapping, to wit, which physical register was last mapped to logical register 5. The entry in the mapper table reflecting the youngest mapping for a given logical register is the youngest entry for that logical register. In the mapper table, the youngest mapping is indicated by setting a flag to a 1 or a 0 value. The flag is typically a single bit flag, and is called the A-bit. Setting the A-bit, that is, setting a value of 1 for the A-bit, in a mapper table entry indicates that that entry is the youngest mapping for a given logical register. Clearing the A-bit, that is, setting a value of 0 for the A-bit in a particular entry indicates that that entry is not the youngest mapping for the logical register shown in that entry.

Tracking the youngest mapping is useful for the correct processing of the subsequent instructions in a set of instructions. For example, the next instruction that is executed may need to read the data from the logical register 5. Based on the tracking of the youngest mapping indicated by the A-bit, the data from the physical register of the youngest mapping can be read for the most current value of logical register 5. Searching for the entry in the mapper table that has the A-bit set for the logical register involved in the current instruction is called a content addressable memory compare, or CAM compare. As instructions are processed, A-bit values of specific entries in the mapper table are set and cleared.

Continuing with the example of 112 physical registers described above, the mapper table has 112 rows. If the processor is designed to handle multiple threads, the number of rows in the mapper table grows proportionally. A thread is a task running on the processor. Multiple threads are multiple tasks running simultaneously on the processor. For a processor handling 4 threads, having 112 physical registers, and each thread being capable of using 32 logical registers, the mapper table has to have at least 32*4=128 rows, plus a certain number of rows for rename registers to be able to accommodate all the physical registers and all the logical register references in all the threads. If the number of rows for the rename registers is R, the total number of rows in the mapper table is 128+R.

For increasing the performance, a large number of rename registers is needed, the large number being comparable to the number of possible in-flight instructions. An in-flight instruction is an instruction that resides in the reorder buffer, which starts when instructions are sent to the sequencer unit, and ends when the instruction is completed.

Large number of rename registers corresponds to a large R. A mapper table of 128+R rows is a large mapper table. Illustrative embodiments recognize that CAM compare using a large mapper table, as in the example above, is expensive and consumes the processor resources of time and space. Large mapper tables are difficult to implement. CAM compare operations using large mapper tables can negatively impact performance of the processor.

Figure 5:
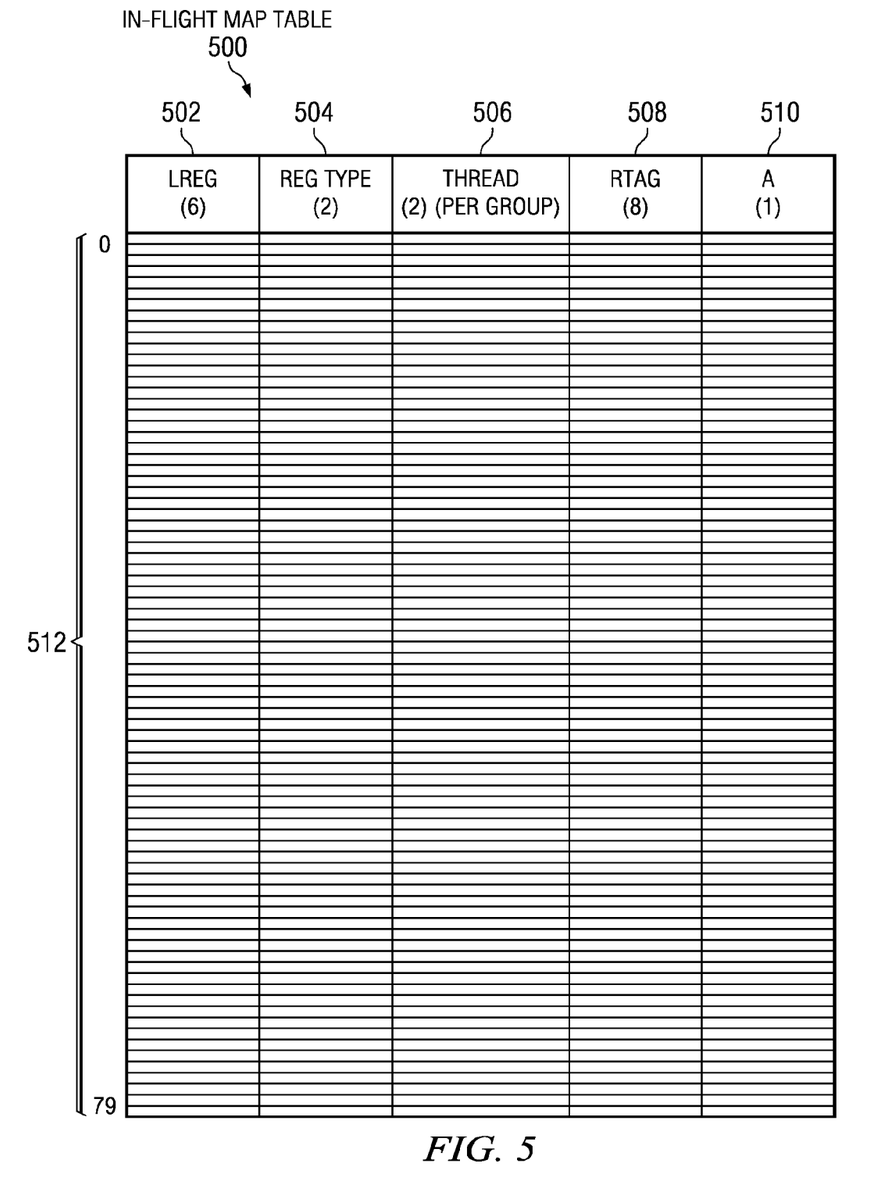
FIG. 5 depicts a block diagram of an in-flight map table in accordance with an illustrative embodiment.

With reference now to FIG. 5, this figure depicts a block diagram of an in-flight map table in accordance with an illustrative embodiment. An implementation of the in-flight map table can use mapper table 410 in FIG. 4 with the following modifications.

In most processor architectures, an instruction loading components, such as instruction cache 314 and load/store unit 328 in FIG. 3, load a certain number of instructions for execution at any given time. The size of a reorder buffer (ROB) determines the number of instructions that can be loaded. A reorder buffer can be implemented using completion buffer 348 in FIG. 3. For example, if the reorder buffer has 80 rows, 80 instructions can be loaded for execution. Another instruction waiting to load has to wait until an in-flight instruction in the reorder buffer has completed executing and can be cleared from a reorder buffer row.

An in-flight map table is a mapper table of the size of the reorder buffer that a mapper, such as mapper 408 in FIG. 4, uses for tracking register mappings of the in-flight instructions. In accordance with the illustrative embodiment, in-flight map table 500 tracks the register mappings of only the in-flight instructions that are in the reorder buffer instead of tracking the mapping of all the physical registers. According to the present method of tracking the mapping of all the physical registers, in the above example of 112 physical registers in a 4 thread execution, if the reorder buffer holds 80 in-flight instructions, the size of the mapper table according to the present architecture would be 128+R rows as described above. In comparison, the size of the in-flight map table according to the illustrative embodiment will only be 80 rows, resulting in a much smaller mapper table. The structure and operation of in-flight map table 500 are described below.

In-flight map table 500 contains information about logical registers in column 502, labeled "LREG". Generally, LREG is a pointer to a logical register. Column 504 labeled "Reg Type" contains information about the type of the physical register to which the corresponding logical register in column 502 is mapped.

Column 506 labeled "Thread" contains information about the thread to which the corresponding logical register in column 502 belongs. Column 508 labeled "RTAG" contains information about the location of the physical register to which the corresponding logical register in column 502 is mapped. Generally, RTAG is a pointer to a physical register. Column 510 labeled "A" contains information about the A-bit of the corresponding logical register in column 502.

Finally, rows 512 represent 80 rows numbered sequentially from 0 to 79. Thus, when in-flight map table 500 contains data, a given row in in-flight map table 500 tells which logical register for which thread is mapped to which physical register of which type, and whether that mapping is the youngest for that logical register in that thread. During operation, a CAM compare for a logical register referenced in a specific instruction in a specific thread should find only one row in in-flight map table 500 that is the youngest mapping of that logical register for that thread.

Note that in-flight map table 500 is only exemplary and is not limiting on the illustrative embodiment. The numerals indicated in parenthesis in each column are exemplary number of bits that may be needed to store the information of that column in each row.

Additionally, note that the table may contain more or less number of rows in a specific implementation. Furthermore, in-flight map table 500 may contain the columns arranged in any order.

Figure 6:
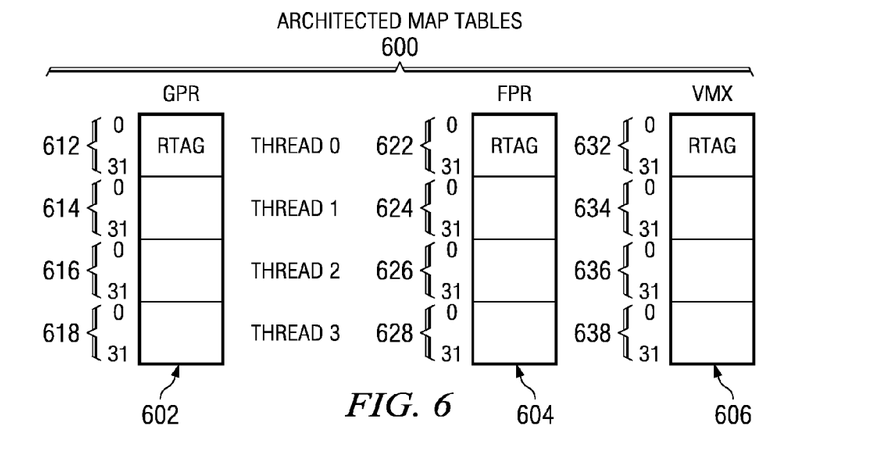
FIG. 6 depicts a set of architected map tables in accordance with an illustrative embodiment.

With reference now to FIG. 6, this figure depicts a set of architected map tables in accordance with an illustrative embodiment. The set of architected map tables 600 can be implemented using mapper table 410 in FIG. 4.

The mapper tracks the state of the registers as the instructions in the reorder buffer are completed. When an instruction completes, using the pointer to the logical register (LREG) as an index into the mapper table, the mapper writes a pointer to a corresponding physical register (RTAG) into that indexed table row. Architecting the data is writing the data in a mapper table in this manner. Architected data is the data in the mapper table that results from this writing. Architected state of a register is the state of the register when architected data exists in the mapper table for that register.

Set of architected map tables 600 includes an architected map table for each type of physical register implemented in a given processor. Table 602 is an architected map table for the GPRs in an exemplary processor. Similarly, table 604 is an architected map table for the FPRs in the exemplary processor; and table 606 is an architected map table for the vector registers ("VMXs") in the exemplary processor.

Each of tables 602, 604, and 606 contain as many number of sets of rows as the number of threads the processor processes. Continuing with the example of 4 threads each referencing 32 logical registers as described above, tables 602-606 each contain 4 sets of rows numbered 0-31, one set for each of the 4 threads numbered 0-3.

Accordingly, rows 612 represent 32 rows of information about 32 logical registers that may be mapped to physical GPRs in thread 0. Rows 614 represent 32 rows of information about 32 logical registers that may be mapped to physical GPRs in thread 1. Rows 616 represent 32 rows of information about 32 logical registers that may be mapped to physical GPRs in thread 2. Rows 618 represent 32 rows of information about 32 logical registers that may be mapped to physical GPRs in thread 3.

Rows 622 represent 32 rows of information about 32 logical registers that may be mapped to physical FPRs in thread 0. Rows 624 represent 32 rows of information about 32 logical registers that may be mapped to physical FPRs in thread 1. Rows 626 represent 32 rows of information about 32 logical registers that may be mapped to physical FPRs in thread 2. Rows 628 represent 32 rows of information about 32 logical registers that may be mapped to physical FPRs in thread 3.

Rows 632 represent 32 rows of information about 32 logical registers that may be mapped to physical VMXs in thread 0. Rows 634 represent 32 rows of information about 32 logical registers that may be mapped to physical VMXs in thread 1. Rows 636 represent 32 rows of information about 32 logical registers that may be mapped to physical VMXs in thread 2. Rows 638 represent 32 rows of information about 32 logical registers that may be mapped to physical VMXs in thread 3.

Once the mapper marks the data in a particular physical register as architected, the mapper moves the corresponding information in the in-flight map table, such as in-flight map table 500 in FIG. 5, to the set of architected map tables. For example, suppose a logical register 5 in thread 0 is mapped to a general-purpose register 2 in the in-flight map table. When the instruction using that mapping completes, the "RTAG" value in column 508 for that mapping in the in-flight map table 500 in FIG. 5 is moved to table 602, to row number 5 in rows 612. The mapper moves other architected data also accordingly when architected.

From the mapper having moved the data from an in-flight map table to an architected map table in this manner; a row in the in-flight map table becomes available to accommodate a new in-flight instruction. A subsequent instruction can still find the old mapping of a finished instruction in the architected map tables if the subsequent instruction needs that data.

Note that the set of architected map tables 600 in FIG. 6 is only exemplary and is not limiting on the illustrative embodiment. Other types of registers implemented in a specific processor can have additional architected map tables similar to any one of the architected map tables 600 depicted in FIG. 6.

The number of rows in each table, and the number of threads represented in each table can also vary according to specific implementation without departing from the scope or spirit of the illustrative embodiment. Different sizes of information stored in each row according to specific implementations are within the scope of the illustrative embodiment.

Figure 7:
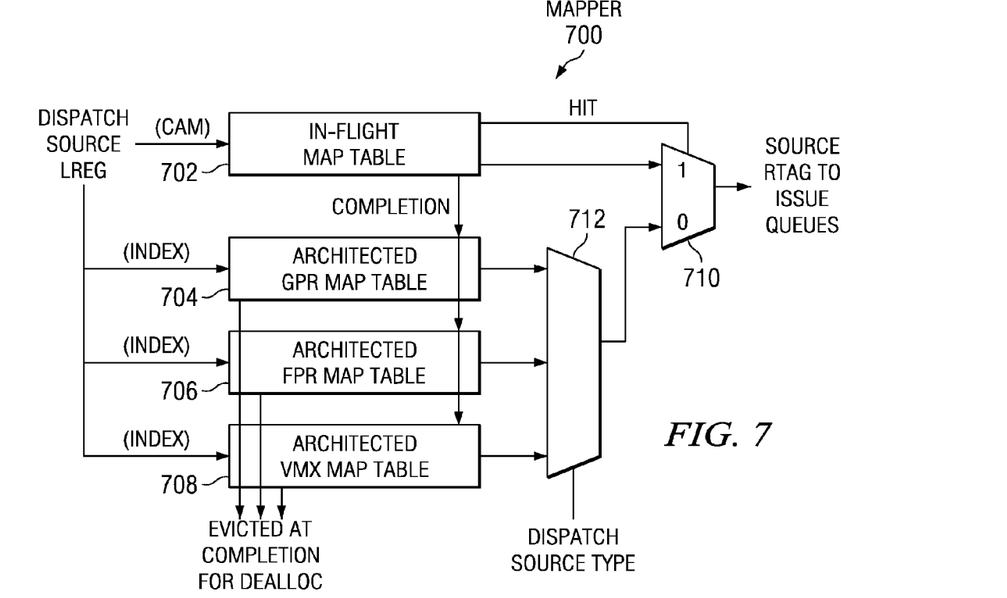
FIG. 7 depicts a block diagram of a mapper in accordance with an illustrative embodiment.

With reference now to FIG. 7, this figure depicts a block diagram of a mapper in accordance with an illustrative embodiment. A specific implementation can implement the mapper of the illustrative embodiment using mapper 408 in FIG. 4, together with the features of the illustrative embodiment described below.

Mapper 700 includes in-flight map table 702, which is similar to in-flight map table 500 in FIG. 5. Mapper 700 further includes architected general-purpose map table 704, which is similar to architected map table 602 in FIG. 6. Mapper 700 further includes architected floating-point map table 706, which is similar to architected map table 604 in FIG. 6. Mapper 700 further includes architected vector map table 708, which is similar to architected map table 606 in FIG. 6.

Mapper 700 also includes multiplexer 710, which multiplexes the result of the search into the in-flight map table 702 and the result of the search in the set of architected map tables.

Mapper 700 further includes multiplexer 712, which multiplexes the result of the search into each architected map table in the set of architected map tables.

Note that any number of architected map tables can be present in a specific implementation without departing from the scope and spirit of the illustrative embodiment. The operation of mapper 700 is described below by continuing with the example of a logical register 5 for thread 0 mapped to a physical general-purpose register 2.

In operation, suppose an instruction that wrote data in the logical register 5 has completed. The mapper architects and moves the data in physical register 2 to the architected map table for physical general-purpose registers as described with respect to FIG. 7.

Now suppose a new instruction in the same thread dispatches and wants to read the data in logical register 5. The data in logical register 5 can reside in one of two places. First, if the instruction that wrote the logical register 5 is still in the in-flight map table, a CAM compare can find the data for the new instruction in the in-flight map table.

Second, if the data is architected and has been moved by the mapper to one of the architected map tables, that data will not be present in the in-flight map table. However, the mapper can find the architected data for the new instruction in one of the architected map tables by indexing into the rows of architected map tables using the logical register number as the index. Thus, the data in logical register 5 will alternatively be present at the logical register index for that thread in one of the architected map tables.

Depending on whether the matching entry for logical register 5 was in the in-flight map table, or in one of the architected map tables, the multiplexers in mapper 700 provide a single output value for the search. The single output value is the location of the physical register where the instruction wanting to read logical register 5 can find the data last written into logical register 5. New physical register information (RTAG) in the architected map tables indicates new architected state for a given logical register (LREG). The mapper may remove, or evict old physical register information for that logical register from the architected map tables. Subsequent instructions may reuse these evicted physical registers.

Figure 8:
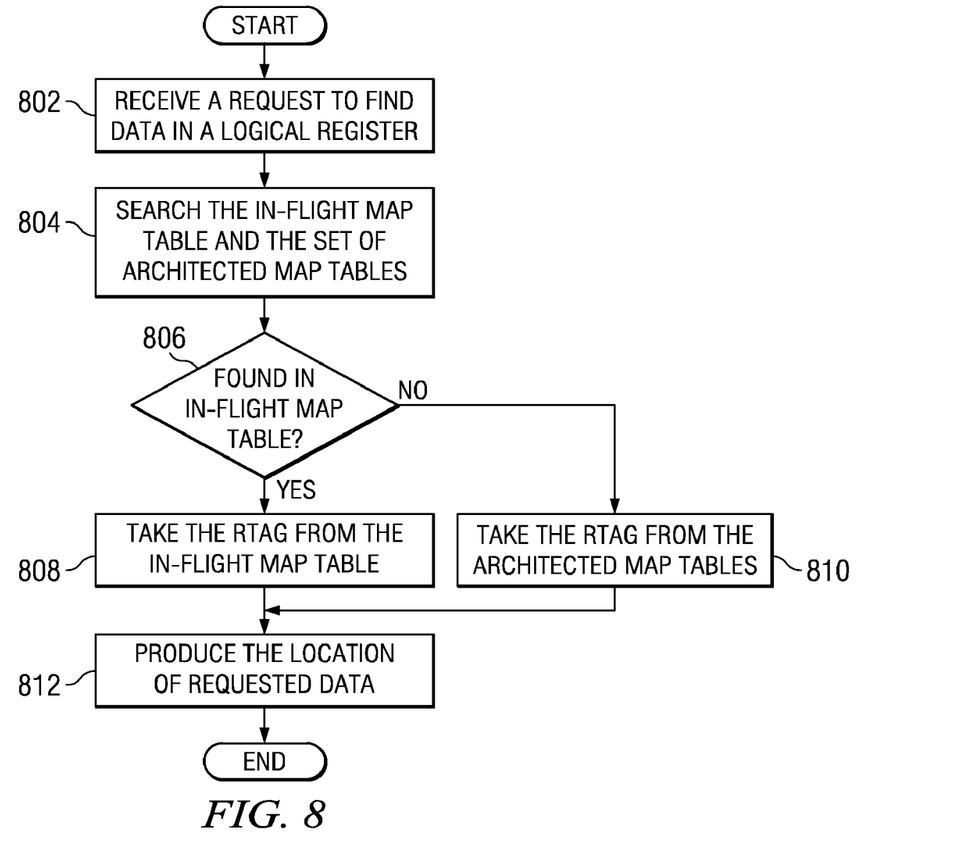
FIG. 8 depicts a flowchart of the process of using the mapper in accordance with an illustrative embodiment.

With reference now to FIG. 8, this figure depicts a flowchart of the process of using the mapper in accordance with an illustrative embodiment. The process can use a mapper, such as mapper 700 in FIG. 7.

The process begins by receiving a request to find the data in a given logical register (step 802). The process performs a search for the data in the logical register into the in-flight map table and the set of architected map tables (step 804). The two-part search can proceed simultaneously or consecutively in specific implementations.

Next, the process determines if the data for the given logical register is found in the in-flight map table (step 806). If the process finds the data in the in-flight map table ("yes" path of step 806), the process selects the physical register location information (RTAG) corresponding to the given logical register from the in-flight map table (step 808).

If the process does not find the data in the in-flight map table ("no" path of step 806), the process selects the physical register location information (RTAG) corresponding to the given logical register from one of the architected map tables (step 810). In certain implementations, the process can search all the tables simultaneously and multiplex all the results from searching the in-flight map table, and each of the architected map tables in the set of architected map tables. The process then produces the location of the physical register where the requested data is located (step 812). The process ends thereafter.

Thus, the mapper according to the illustrative embodiments can operate with a smaller mapper table than the mapper table in the present processor architectures. Smaller mapper table, such as the in-flight map table described above, leads to faster processor performance and simpler implementation of the mapper as compared to the present processors.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for register renaming, the computer implemented method comprising:

responsive to receiving a request for a data in a logical register, searching, by a mapper, an in-flight map table that stores register mappings for in-flight instructions and a set of architected map tables for the logical register, wherein the set of architected map tables store register mappings for completed instructions;

identifying, by the mapper, an entry in one of the in-flight map table and an architected map table in the set of architected map tables, the entry corresponding with the logical register in the request; and returning, by the mapper, a location of a physical register in the entry, wherein the physical register contains the requested data.

2. The computer implemented method of claim 1, wherein the size of the in-flight map table is the same as the size of a reorder buffer such that the in-flight table is used to only track register mappings of in-flight instructions in the reorder buffer in lieu of being used to track register mappings for all physical registers.

3. The computer implemented method of claim 1, wherein the set of architected map tables comprises an architected map table for each type of physical register in a processor.

4. The computer implemented method of claim 1, wherein information about the logical register is moved by the mapper from the in-flight map table to the architected map table in the set of architected map table after an instruction using the logical register has completed, wherein the information identifies the location of the physical register.

5. The computer implemented method of claim 1, wherein for identifying the entry, the mapper uses a reference to the logical register as one search criterion.

6. An apparatus for register renaming, the apparatus comprising: a data processor and a plurality of physical registers; and a mapper, wherein responsive to receiving a request for a data in a logical register, the mapper searches an in-flight map table that stores register mappings for in-flight instructions and a set of architected map tables for the logical register, wherein the set of architected map tables store register mappings for completed instructions, wherein the mapper identifies an entry in one of the in-flight map table and an architected map table in the set of architected map tables, wherein the entry corresponds with the logical register in the request, wherein the mapper returns a location of a physical register in the entry, and wherein the physical register contains the requested data.

7. The apparatus of claim 6, wherein the size of the in-flight map table is the same as the size of a reorder buffer such that the in-flight table is used to only track register mappings of in-flight instructions in the reorder buffer in lieu of being used to track register mappings for all physical registers.

8. The apparatus of claim 6, wherein the set of architected map tables comprises an architected map table for each type of physical register in a processor.

9. The apparatus of claim 6, wherein the mapper moves the information about the logical register from the in-flight map table to the architected map table in the set of architected map tables after an instruction using the logical register has completed, wherein the information identifies the location of the physical register.

10. The apparatus of claim 6, wherein the mapper identifies the entry using a reference to the logical register as one search criterion.

11. The computer implemented method of claim 1, wherein the mapper comprises both the in-flight map table and the set of architected map tables.

12. The computer implemented method of claim 1, wherein outputs of each architected map table of the set of architected map tables are coupled to inputs of a first multiplexer having a first multiplexer output, and an output of the in-flight map table and the first multiplexer output are coupled to inputs of a second multiplexer having a second multiplexer output, wherein the second multiplexer output specifies the location of the physical register.

13. The computer implemented method of claim 1, wherein the in-flight map table is accessed by a content addressable memory compare using the logical register as an index into the in-flight map table.

14. The apparatus of claim 6, wherein the mapper comprises both the in-flight map table and the set of architected map tables.

15. The apparatus of claim 6, wherein outputs of each architected map table of the set of architected map tables are coupled to inputs of a first multiplexer having a first multiplexer output, and an output of the in-flight map table and the first multiplexer output are coupled to inputs of a second multiplexer having a second multiplexer output, wherein the second multiplexer output specifies the location of the physical register.

16. The apparatus of claim 6, wherein the in-flight map table is accessed by a content addressable memory compare using the logical register as an index into the in-flight map table.

* * * * *